3,217,016
PRODUCTION OF GLYCIDAMIDE
Friedrich Becke, Heidelberg, and Heinz Buckschewski and Bruno Sander, Ludwigshafen (Rhine), Germany, assignors to Badische Anilin- & Soda-Fabrik Aktiengesellschaft, Ludwigshafen (Rhine), Germany
No Drawing. Filed Nov. 8, 1962, Ser. No. 236,440
Claims priority, application Germany, Nov. 10, 1961, B 64,725
5 Claims. (Cl. 260—348.5)

This invention relates to the production of glycidamide. More specifically, it relates to improvements in the production of this compound.

According to a recently published method glycidamide is prepared by treatment of acrylonitrile with hydrogen peroxide in aqueous solution at a pH-value of 7.0 to 7.5. To work up the reaction mixture a treatment with palladium on animal charcoal is carried out in the said method. The yield of isolatable, analytically pure glycidamide is given as 25% of the theory. Resinous products are formed as byproducts in considerable amounts.

It is an object of this invention to provide a process for the production of glycidamide wherein very much higher yields are obtained than by the known method. Another object of the invention is to provide a process for the production of glycidamide wherein no resinous products are formed. A further object of the invention is a method of working up the reaction mixture.

These and other objects are achieved by intensely mixing the reaction mixture obtained by the treatment of acrylonitrile with hydrogen peroxide at a pH-value of 7.0 to 7.5 with an oxide of a metal of group IVA, VB, VIB or VIIB of the Periodic Chart of the Elements (as published in Handbook of Chemistry and Physics, Chemical Rubber Public Co., 43rd ed., pp. 448, 449).

The production of the reaction mixture from acrylonitrile and about equimolar amounts of hydrogen peroxide is carried out at a pH value of 7.0 to 7.5 at room temperature or slightly elevated temperature, e.g., up to to 40° C., and at normal pressure. The reaction may be carried out in aqueous solution, but also in other solvents, for example in low molecular weight alkanols of from 1 to 4 carbon atoms. The use of alkanolic, especially methanolic, solutions is advantageous because they are simpler to work up. The ratio of acrylonitrile to solvent should be in the range of from 1:5 to 1:20. With higher proportions of acrylonitrile, the reaction may be uneconomical. The pH of 7.0 to 7.5 is maintained by continuously adding alkali hydroxides, alkali carbonates and NaHCO$_3$.

Treatment of the reaction mixture according to the invention is affected with oxides of metals of groups IVA, VB, VIB and VIIB of the Periodic System, for example tin oxide, tin dioxide, lead dioxide, lead oxide, vanadium pentoxide, chromium trioxide, tungsten trioxide, manganese dioxide or manganous oxide. Although all these metals may have various structures, they all are effective. Lead dioxide and manganese dioxide have proved to be particularly suitable.

Treatment of the reaction mixture with said metal oxides may be effected by mixing it with finely divided metal oxides, for example, by shaking or stirring for 10 to 30 minutes at a temperature of from 30° C. to 40° C. It is, however, also possible to pass the reaction mixture over layers of the said metal oxides of suitable thickness. The relative proportions and residence periods should be regulated according to the nature of the treatment and the form in which the metal oxides are used. As a rule, an amount of at least 0.5 to 1.0 mole of metal oxide per mole of acrylonitrile should be used. A suitable amount, if finely powdered pyrolusite (MnO$_2$) is used, is about 0.9 to 1.0 mole of pyrolusite per mole of acrylonitrile. When using lead dioxide in fine division, 0.5 to 0.6 mole of lead dioxide per mole of acrylonitrile is sufficient.

When using other metal oxides, the amount which gives optimum results can easily be determined by a simple preliminary experiment. It is uneconomical to use more metal oxide than necessary.

If the process is carried out continuously, it is advantageous to use coarse-particled metal oxides and to pass the reaction mixture over a layer of these particles. A residence period of at least 30 minutes should be maintained, however the period of treatment which gives the best results should be determined by preliminary trials. There is no adverse effect through allowing the metal oxides to act for a longer time than the most economical one, but the space/time yield would be reduced in this way.

After the treatment of the reaction mixture with the metal oxides any solid particles in the mixtures are removed, e.g., by filtration or centrifugation and the glycidamide is recovered from the solution thus obtained by distillation.

The yield of isolatable, analytically pure glycidamide obtainable by the process according to this invention is approximately 50 to 60% of the theory. Resinous byproducts are not formed.

Glycidamide can be used as an intermediate in the production of dyes and plasticizers. For instance, a violet dye of the formula

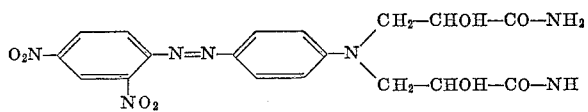

may be obtained by reacting glycidamide with aniline and coupling the reaction product obtained with diazotized 2,4-dinitroaniline. The dye mentioned is suitable for the dying of synthetic polyamide fibers.

The invention is illustrated by, but not limited to, the following examples in which parts, unless otherwise stated, are by weight. Parts by weight and parts by volume bear the same relation as the gram and cubic centimeter.

*Example 1*

53 parts of acrylonitrile and 125 parts of 30% hydrogen peroxide are allowed to act on each other for five hours in 300 parts by volume of distilled water while stirring at a pH value of 7.3 and a temperature of about 35° C. The pH value is kept constant by slow addition of a n-NaOH solution.

Working up of the reaction mixture is carried out by introducing about 8 parts of finely powdered pyrolusite (MnO$_2$) in portions into the reaction mixture while stirring. Pyrolusite is added until the color reaction of peroxides with titanyl sulfate solution is negative.

The metal oxide is then filtered off and the water distilled off under reduced pressure at 25 to 30 mm. Hg at about 30° to 40° C. The residue is treated with acetone to dissolve out the constituents which are soluble in acetone. The solution is dried with sodium sulfate and magnesium sulfate. After the solution has been dried, the acetone is distilled off on a waterbath at 30° C. and under greatly reduced pressure.

The residue is fractionally distilled at a pressure of 0.2 mm. Hg 50.5 parts (58% of the theory) of analytically pure glycidamide having the melting point 33° to 34° C. is obtained.

*Example 2*

The procedure of Example 1 is followed by the reaction solution and is treated in an analogous way with about 24 parts of lead dioxide. The metal oxide is filtered off from the solution and the latter worked up as described in Example 1.

49.8 parts (57.3% of the theory) of analytically pure glycidamide having the melting point 33° to 34° C. is obtained by distillation at a pressure of 0.2 mm. Hg.

*Example 3*

The procedure of Example 1 is followed but the two reactants are allowed to act on each other in 300 parts by volume of methanol. The reaction mixture is treated with pyrolusite in an analogous way to that described in the foregoing examples. Working up is carried out as described in Example 1.

50.0 parts (57.5% of the theory) of analytically pure glycidamide having the melting point 33° to 34° C. is obtained.

Lead dioxide may be used instead of pyrolusite and practically the same result is obtained.

*Example 4*

The procedure of Example 1 is followed but the reaction solution is treated in analogous manner with about 60 to 70 parts of manganous oxide or 50 to 60 parts of litharge. The solution is filtered off from the metal oxide and worked up as described in Example 1.

The yield of analytically pure glycidamide, based on acrylonitrile, is between 50 and 55% of the theory.

*Example 5*

The procedure of Example 1 is followed, but the reaction solution is treated in analogous manner with approximately 15 to 20 parts of vanadium pentoxide. The solution is filtered from the metal oxide and worked up as described in Example 1.

48.0 parts (55.2% of the theory) of analytically pure glycidamide of the melting point 33° to 34° C. is obtained.

We claim:

1. The process for the production of glycidamide by the epoxidation of acrylonitrile which comprises mixing acrylonitrile and hydrogen peroxide in about equimolar amounts in a solvent selected from the group consisting of water and alkanols of 1 to 4 carbon atoms and mixtures thereof at a temperature of about 30° to 40° C., the pH value of the reaction mixture being maintained at 7.0 to 7.5 ; adding a metal oxide to the reaction mixture after the epoxidation has been completed, said metal oxide being selected from the group consisting of tin oxide, tin dioxide, lead dioxide, lead oxide, vanadium pentoxide, chromium trioxide, tungsten trioxide, manganese dioxide, and manganous oxide, and thereafter recovering glycidamide from the reaction solution.

2. The process for the production of glycidamide by the epoxidation of acrylonitrile which comprises mixing acrylonitrile and hydrogen peroxide in about equimolar amounts in a solvent selected from the group consisting of water and alkanols of 1 to 4 carbon atoms and mixtures thereof at a temperature of about 30° to 40° C., the pH value of the reaction mixture being maintained at 7.0 to 7.5; adding manganese dioxide to the reaction mixture after the epoxidation has been completed; and thereafter recovering glycidamide from the reaction solution.

3. The process for the production of glycidamide by the epoxidation of acrylonitrile which comprises mixing acrylonitrile and hydrogen peroxide in about equimolar amounts in a solvent selected from the group consisting of water and alkanols of 1 to 4 carbon atoms and mixtures thereof at a temperature of about 30° to 40° C., the pH value of the reaction mixture being maintained at 7.0 to 7.5; adding lead dioxide to the reaction mixture after the epoxidation has been completed; and thereafter recovering glycidamide from the reaction solution.

4. The process as in claim 2 wherein from 0.5 to 1.0 mol of finely powdered manganese dioxide per mol of acrylonitrile is used as the metal oxide.

5. The process as in claim 3 wherein from 0.5 to 0.6 mol of finely divided lead dioxide per mol of acrylonitrile is used as the metal oxide.

References Cited by the Examiner
UNITED STATES PATENTS

| | | | |
|---|---|---|---|
| 2,650,927 | 9/53 | Gasson | 260—348.5 |
| 2,786,854 | 3/57 | Smith et al. | 260—348.5 |
| 3,053,857 | 9/62 | Payne | 260—348.5 XR |
| 3,122,569 | 2/64 | Kaman | 260—348.5 |

WALTER A. MODANCE, *Primary Examiner.*

NICHOLAS S. RIZZO, *Examiner.*

UNITED STATES PATENT OFFICE
CERTIFICATE OF CORRECTION

Patent No. 3,217,016                          November 9, 1965

Friedrich Becke et al.

It is hereby certified that error appears in the above numbered patent requiring correction and that the said Letters Patent should read as corrected below.

Column 2, lines 30 to 34, for the lower right-hand portion of the formula reading "-CO-NH" read -- -CO-$NH_2$ --.

Signed and sealed this 18th day of October 1966.

(SEAL)
Attest:

ERNEST W. SWIDER                      EDWARD J. BRENNER
Attesting Officer                         Commissioner of Patents